Dec. 17, 1963     C. R. McNUTT     3,114,911
ROTATABLE, TOWABLE, RADAR TRIHEDRON REFLECTOR
Filed Sept. 25, 1959     2 Sheets—Sheet 1

INVENTOR.
CLARENCE R. McNUTT
BY
AGENT

Dec. 17, 1963  C. R. McNUTT  3,114,911
ROTATABLE, TOWABLE, RADAR TRIHEDRON REFLECTOR
Filed Sept. 25, 1959  2 Sheets-Sheet 2

INVENTOR.
CLARENCE R. McNUTT
BY
AGENT

United States Patent Office 3,114,911
Patented Dec. 17, 1963

3,114,911
ROTATABLE, TOWABLE, RADAR TRIHEDRON REFLECTOR
Clarence R. McNutt, Philadelphia, Pa., assignor to the United States of America as represented by the Secretary of the Navy
Filed Sept. 25, 1959, Ser. No. 842,538
3 Claims. (Cl. 343—18)
(Granted under Title 35, U.S. Code (1952), sec. 266)

The invention herein described may be manufactured and used by or for the Government of the United States of America for governmental purposes without the payment of any royalties thereon or therefor.

This invention relates to improvements in radar reflectors and more particularly relates to reflectors for use with radar ranging and detecting apparatus.

An object of the invention is the provision of novel means for increasing the effectiveness and usefulness of radar reflectivity of an airborne radar reflector, and more particularly, to increase the inclusive angle of radar reflectivity to a pursuing aircraft of an airborne radar reflector of a uniform and regular geometrical configuration.

Another object of the present invention is the provision of a radar reflector of the type employing three reflector planes forming a right trihedron suitable for use with gunnery radar ranging and detecing apparatus.

Another object of the invention is the provision of a novel, easily and cheaply manufactured and installed rotating right trihedral radar reflector suitable for use with aircraft gunnery radar ranging and detecting apparatus.

A still further object of the invention is the provision of a rotating reflector referred to in the preceding object suitable for being easily connected to and towed with a flexible cable from a towing aircraft.

Another object of the invention referred to hereinabove is the provision of a rotating radar reflector suitable for use in connection with an serial tow target, the rotation of the reflector being accomplished with a plurality of fin tabs or vanes.

The invention further resides in certain novel features of construction, combinations and arrangements of parts, and further objects and advantages of the invention will be apparent to those skilled in the art to which it pertains from the following description of the present preferred embodiment thereof described with reference to the accompanying drawings, which form a part of this specification, and wherein the same reference characters represent corresponding parts throughout the several views and in which.

Figure 1:
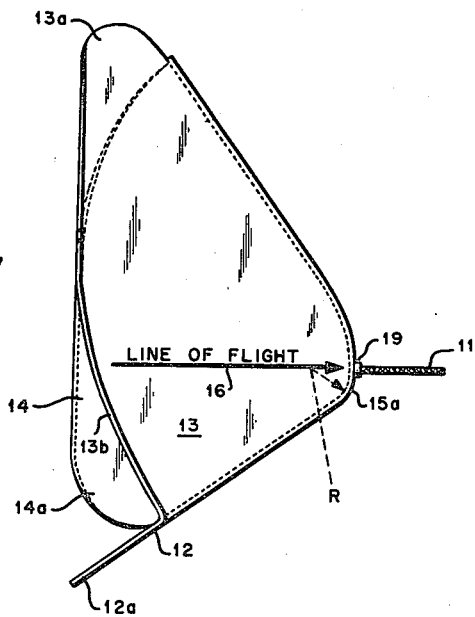
FIG. 1 is a side elevational view of a device embodying the invention.

It is to be understood that the invention is not limited to the details of construction and arrangement of parts shown in the drawings and hereinafter described in detail, but is capable of being practiced or carried out in various ways. It is to be further understood that the phraseology or terminology employed herein is for the purpose of description and there is no intention to herein limit the invention beyond the requirements of the prior art.

Referring to FIG. 1, a radar reflective device embodying the invention is indicated generally by the reference numeral 10, and is comprised of a single piece of sheeting suitably formed into the general shape of a right trihedron. The radar reflector 10 is adapted to be towed from an airborne aircraft, not shown, at the end of a flexible cable 11. The device 10 is comprised of three panels 12, 13, 14 with a circular opening formed in a blunted, arcuate apex portion 15 thereof coaxial with the cable 11.

The device 10, being substantially a right trihedron, obviously has its axis of symmetry passing through the apex and centroid thereof. In the illustrated embodiment, this axis is shown coinciding with a line of flight 16.

Figure 3:
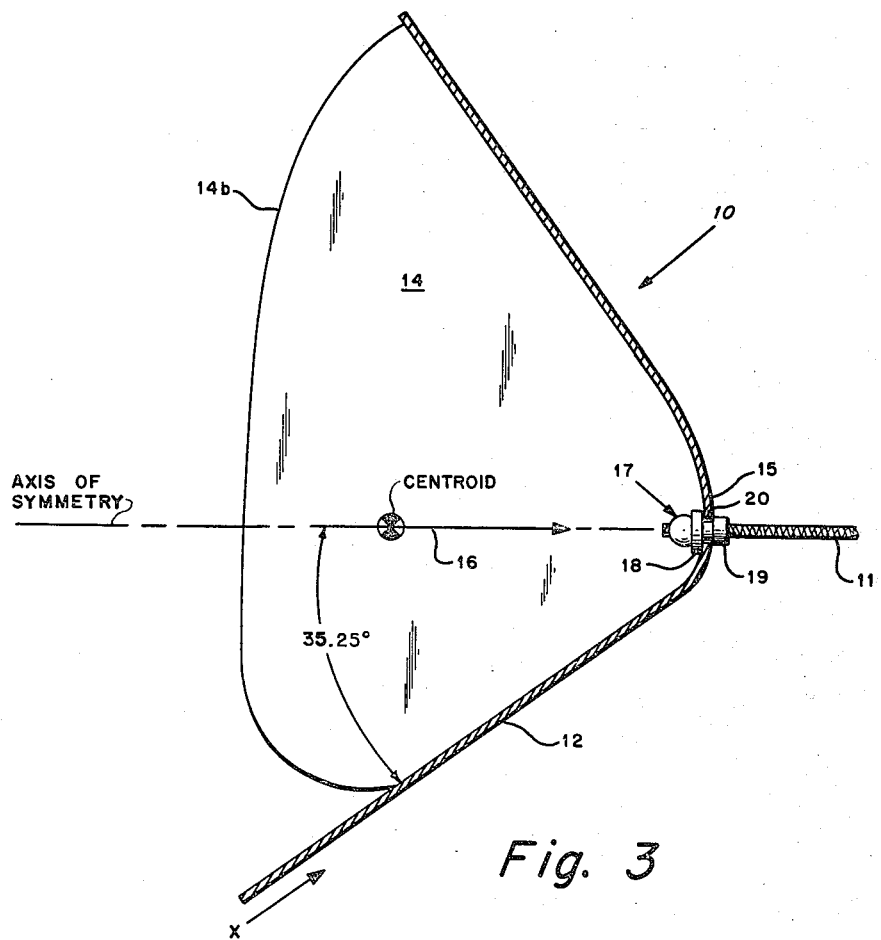
FIG. 3 is a view along section line 3—3 in FIG. 2.

As best seen in FIG. 3 the end of the cable 11 is provided with a ball end device, indicated generally by the reference numeral 17, having a pair of parallel flanges 18, 19 spaced apart by a cylindrical neck portion 20. The opening in the apex portion 15 is large enough to slip over the flange 19, but not over the flange 18. The neck portion 20 is provided to reduce friction during the rotation of the reflector 10 about the symmetrical axis relative to the ball end 17.

The rotative motion of the reflector 10 is provided by three generally arcuate, semicircular vane portions 12a, 13a, 14a integrally formed coplanar with the panels 12, 13, 14, respectively. Each of the panels 12, 13, 14 is generally of the shape of a right triangle, but with the two legs or edges of each side being joined by a smoothly curved apex portion. A part 15a of the apex portion 15 has a radius R with the balance of the portion 15 being smoothly contoured with the opposite leg or edge of the side. As best seen in FIG. 3, the common edge of panels 13, 14 in the instant embodiment subtends an angle of 54.75° with the symmetrical axis, and the panel 12 subtends an angle of 35.25° with the symmetrical axis.

Figure 2:
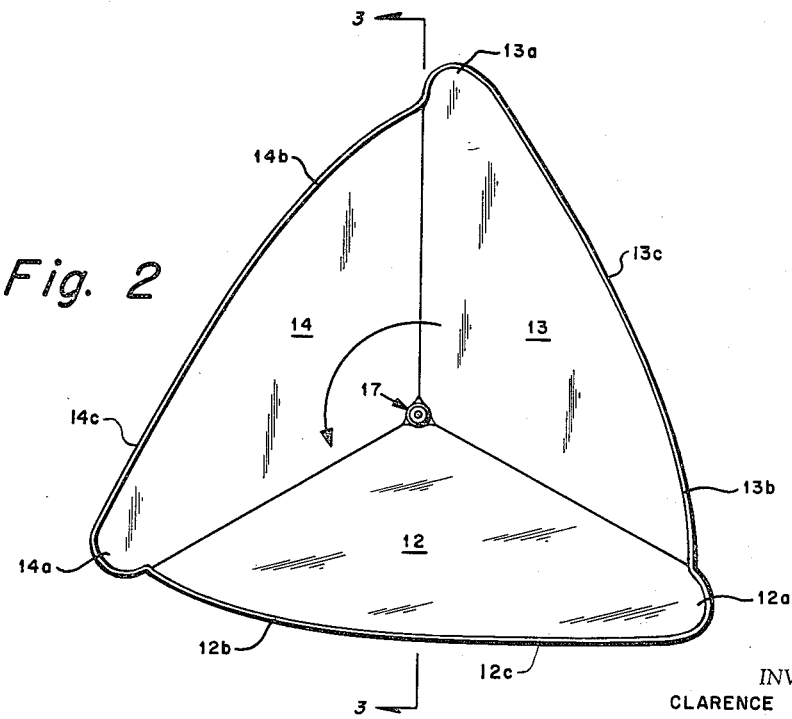
FIG. 2 is a rear view of the device in FIG. 1.

The vane portions 12a, 13a, 14a are so formed as to provide counterclockwise rotation of the reflector 10, FIG. 2. Each of the edges formed by the panels 12, 13, 14 are of a length preferably six times the radius of the vane portions 12a, 13a, 14a.

Each of the trailing edges of panels 12, 13, 14 have arcuately curved edge portions 12b, 13b, 14b which preferably extend from the midpoint of the trailing edges to the vane of the edge of the adjoining side. The trailing edge portions 12c, 13c, 14c are rectilinear between the vane portions 12a, 13a, 14a and edge portions 12b, 13b, 14b, respectively, if extended would form the hypotenuse of an isosceles right triangle.

For best results, the surfaces of each of the panels 12, 13, 14 are true and flat within .002 inch. Also preferably, the reflector 10 is formed of cold rolled sheet steel. It will be understood however that the reflector can be made of other materials and in different sizes.

The advantages of the invention will be apparent if a comparison is made between a non-rotating and a rotating right trihedral radar reflector. A consideration of a non-rotating trihedral radar reflector, acting as a target, will indicate that its capability to provide reliable radar echoes is a function of the orientation of the trihedral recflector with respect to an aircraft, pursing from the rearward direction.

As shown in FIG. 3, the trihedral radar reflector possesses the critical angle of 35.25° measured between the line of flight of the towed trihedral reflector and the panel 12.

A pursuing aircraft, approaching from a remote point such as indicated by an arrow X with relation to FIG. 3, will receive little, if any, radar return since the prominent microwave energy will graze the panel 12 at a high incidence angle with a consequence that little reflected signal will be received by the radar receiving equipment in the pursing aircraft.

Conversely, within the area subtended by a total angular limit of 90°, an aircraft converging on the radar reflector experiences least difficulty in tracking since the exterior faces of the reflector present reflective surfaces of appropriate inclination for maximum reflection of radar echoes. If the reflector 10, FIG. 3, is rotated 60 from its present position relative to arrow X the angle through which the aircraft approaches the reflector is now increased to 54.75°, measured between the axis of symmetry of the trihedral reflector and appropriate intersection of the perpendicular faces. Accordingly, the angle subtended by the reflector has been effectively increased and constancy of radar echoes is more fully assured.

However various factors contribute to uncertainty in achieving the desired constancy of radar echoes with a non-rotating radar reflector, since a non-rotating reflector will assume a random orientation with respect to the pursuing craft. Thus, to effectively maintain an overall angle of 109.5°, the fin tabs operate to supply rotation to the reflector. Hence, the advantages of the invention reside in the positive increased reliability of radar return signals over a wider range of attack angles.

It will also be understood that the present invention may be modified to adapt it to various circumstances and conditions, and it is accordingly desired to comprehend within the purview of this invention such modifications as may be considered to come within the scope of the appended claims.

What is claimed is:

1. A radar reflector adapted to be trailed from an aircraft, comprising, three symmetrical flat panels connected together in the shape of a right trihedron, each of said panels being generally in the shape of a right triangle with the hypotenuse side thereof forming the trailing edge of each panel, each of said panels having arcuately contoured coplanar vane portions integral therewith, a segment of said trailing edge of each of said panels being arcuately curved inwardly towards the vane portion of an adjacent one of said panels, said panels being comprised of material which reflects radio waves, means for rotatably mounting said trihedron at the trailing end of a cable attached to the aircraft about a symmetrical axis passing through the apex and the centroid of said trihedron and thereby providing a radar reflector having a greater reliability of radar return signals over a wider range of attack angles.

2. A radar reflector as set forth in claim 1, wherein said arcuately curved trailing edge of each of said panels has a center of arc at the theoretical apex of said trihedron.

3. A radar reflector as set forth in claim 1, wherein each of said panels subtends an angle of 35.25° with said symmetrical axis.

References Cited in the file of this patent

UNITED STATES PATENTS

| 1,797,234 | Jordan | Mar. 24, 1931 |
| 2,543,130 | Robertson | Feb. 27, 1951 |
| 2,697,828 | Heintz | Dec. 21, 1954 |
| 2,805,065 | Cotton | Sept. 3, 1957 |
| 2,823,376 | Baldwin et al. | Feb. 11, 1958 |
| 2,869,120 | Lolmaugh et al. | Jan. 13, 1959 |
| 2,898,058 | Del Mar | Aug. 4, 1959 |
| 2,898,588 | Graham | Aug. 4, 1959 |
| 3,010,104 | Powell | Nov. 21, 1961 |